US009058557B2

(12) United States Patent
Kawabata et al.

(10) Patent No.: US 9,058,557 B2
(45) Date of Patent: Jun. 16, 2015

(54) IMAGE FORMING APPARATUS, SETTING METHOD, AND NON-TRANSITORY COMPUTER-READABLE RECORDING MEDIUM ENCODED WITH SETTING PROGRAM

(75) Inventors: Mie Kawabata, Toyohashi (JP); Junichi Isamikawa, Toyokawa (JP); Shinichi Asai, Gamagoori (JP); Takashi Oikawa, Toyohashi (JP); Takao Kurohata, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 178 days.

(21) Appl. No.: 13/407,399

(22) Filed: Feb. 28, 2012

(65) Prior Publication Data
US 2012/0224198 A1 Sep. 6, 2012

(30) Foreign Application Priority Data

Mar. 2, 2011 (JP) .................................. 2011-044617

(51) Int. Cl.
H04N 1/60 (2006.01)
G06K 15/02 (2006.01)
G06K 15/00 (2006.01)
(Continued)

(52) U.S. Cl.
CPC .......... *G06K 15/186* (2013.01); *G06K 15/1882* (2013.01); *G06K 15/1822* (2013.01); *G06K 15/408* (2013.01)

(58) Field of Classification Search
CPC ......... G06K 15/02; G06K 15/00; H04N 1/22; H04N 1/6033; H04N 1/52; H04N 1/6058; H04N 1/603; G06F 3/041
See application file for complete search history.

(56) References Cited

U.S. PATENT DOCUMENTS

2005/0246631 A1 11/2005 Mori et al.
2007/0195064 A1* 8/2007 Morioka ....................... 345/173
(Continued)

FOREIGN PATENT DOCUMENTS

CN 1684061 A 10/2005
CN 101271299 A 9/2008
(Continued)

OTHER PUBLICATIONS

Notice of Allowance mailed Aug. 13, 2013, directed to JP Application No. 2011-044617; 6 pages.
(Continued)

*Primary Examiner* — Fred Guillermety
*Assistant Examiner* — Henok A Shiferaw
(74) *Attorney, Agent, or Firm* — Osha Liang LLP

(57) ABSTRACT

An image forming apparatus includes a setting screen displaying portion to display a setting screen on a display portion, an input screen displaying portion to display an input screen including input keys on the display portion, a position detecting portion to detect a position designated by a user on a display surface of the display portion, an item selecting portion to select one of a plurality of setting items on the setting screen, a setting value accepting portion to accept a value determined by the input key designated by the user as a setting value for the setting item being selected, and a designation accepting portion, provided independently of the position detecting portion, to accept a user's designation. The input screen displaying portion displays the input screen on the display portion when the designation accepting portion accepts a first designation in the state where the setting screen is being displayed.

19 Claims, 9 Drawing Sheets

(51) Int. Cl.
    *G06F 3/12*           (2006.01)
    *H04N 1/04*          (2006.01)
    *G06F 3/041*         (2006.01)

(56) References Cited

U.S. PATENT DOCUMENTS

| | | | |
|---|---|---|---|
| 2008/0231914 A1* | 9/2008 | Motoyoshi | 358/474 |
| 2008/0266467 A1 | 10/2008 | Okamoto et al. | |
| 2009/0129802 A1 | 5/2009 | Yasukawa | |
| 2009/0172585 A1 | 7/2009 | Sato | |
| 2009/0189870 A1* | 7/2009 | Ueda et al. | 345/173 |

FOREIGN PATENT DOCUMENTS

| | | |
|---|---|---|
| CN | 101436012 A | 5/2009 |
| CN | 101494713 A | 7/2009 |
| JP | 6-4259 | 1/1994 |
| JP | 8-221169 | 8/1996 |
| JP | 10-11190 | 1/1998 |
| JP | 2004-252727 | 9/2004 |
| JP | 2007-102497 | 4/2007 |
| JP | 2007-179438 | 7/2007 |
| JP | 2008-018541 | 1/2008 |
| JP | 2008-287323 | 11/2008 |
| JP | 2009-157753 | 7/2009 |
| JP | 2009-176115 | 8/2009 |

OTHER PUBLICATIONS

Notice of Ground of Rejection mailed May 21, 2013, directed to Japanese Application No. 2011-044617; 5 pages.
Office Action issued in counterpart Japenese Patent Application No. 201210047907.4 dated Feb. 18, 2014 (14 pages).
Second Office Action issued in corresponding Chinese Application No. 201210047907.4 dated Nov. 15, 2014, and English translation thereof (14 pages).

* cited by examiner

F I G. 1
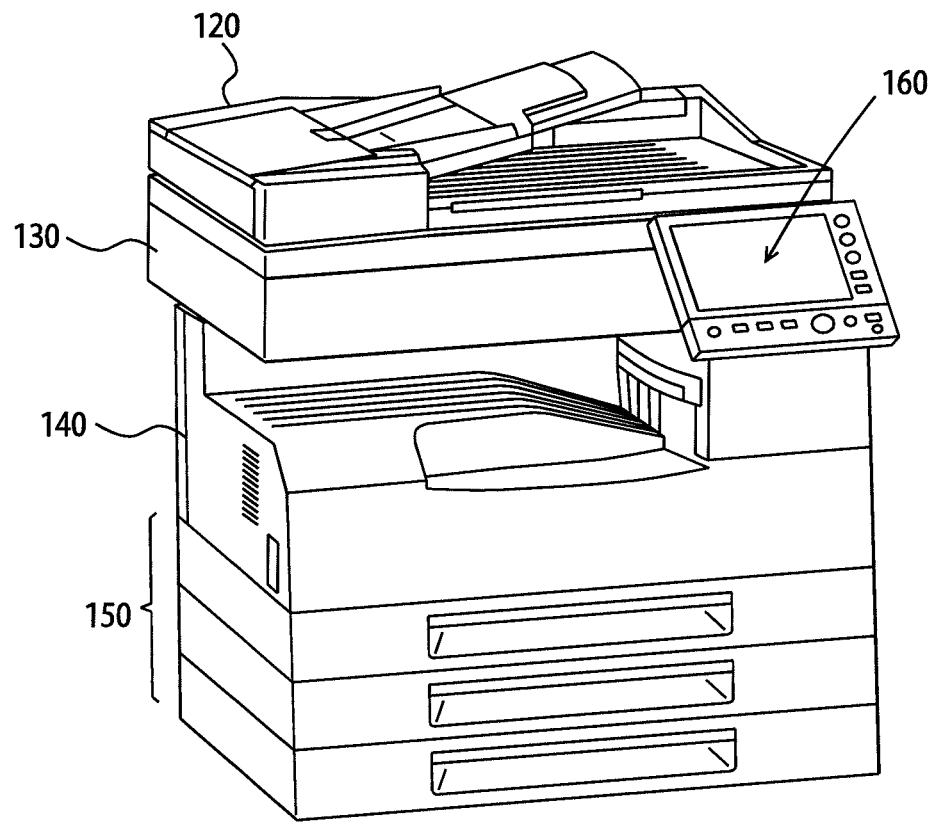

F I G. 2
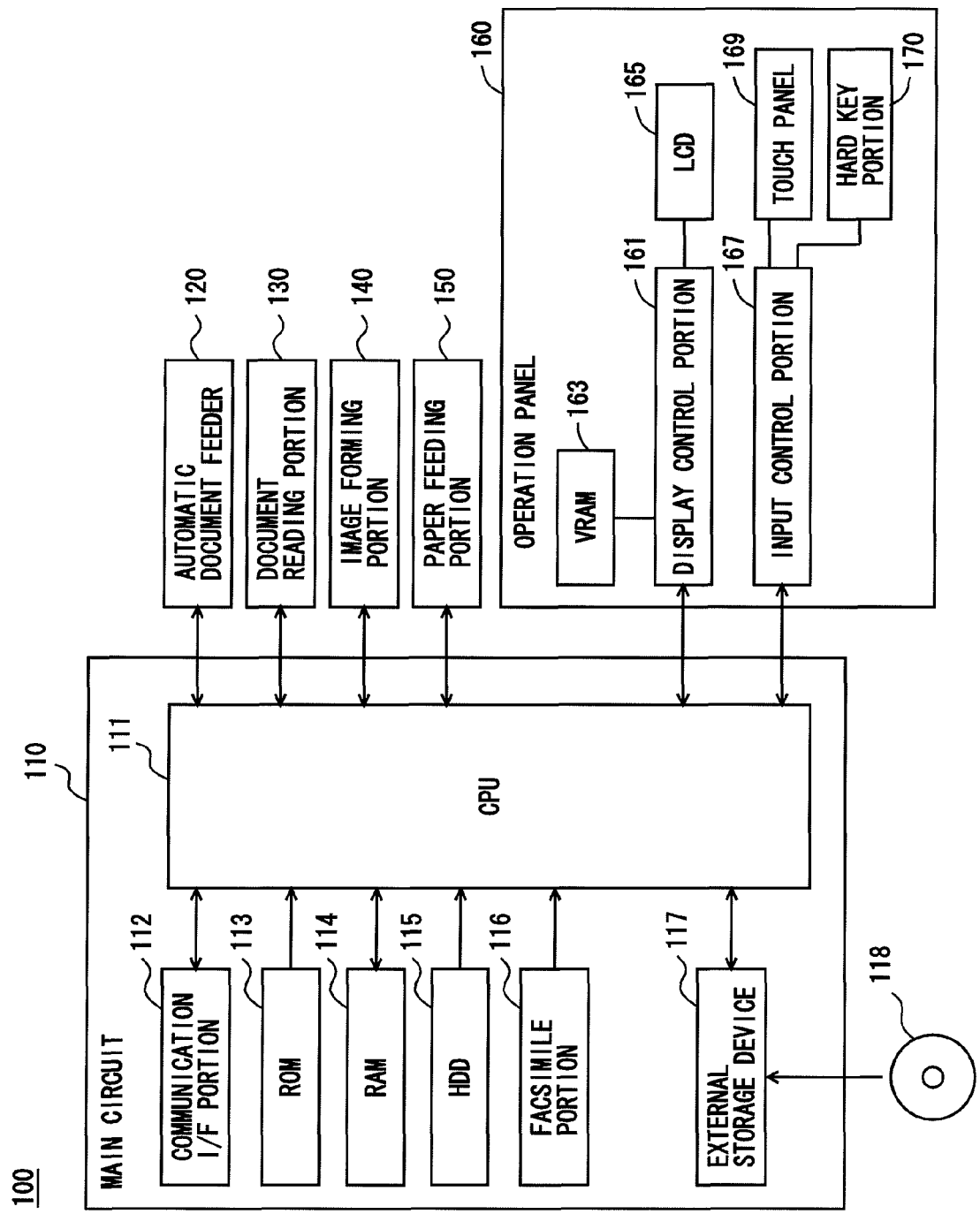

IMAGE FORMING APPARATUS, SETTING METHOD, AND NON-TRANSITORY COMPUTER-READABLE RECORDING MEDIUM ENCODED WITH SETTING PROGRAM

This application is based on Japanese Patent Application No. 2011-044617 filed with Japan Patent Office on Mar. 2, 2011, the entire content of which is hereby incorporated by reference.

BACKGROUND OF THE INVENTION

1. Field of the Invention

The present invention relates to an image forming apparatus, a setting method, and a non-transitory computer-readable recording medium encoded with a setting program. More particularly, the present invention relates to an image forming apparatus which performs processing in accordance with setting values, a setting method executed by the image forming apparatus, and a non-transitory computer-readable recording medium encoded with a setting program for causing a computer to execute the setting method.

2. Description of the Related Art

Recently, a soft keyboard is used as a user interface in an image forming apparatus typified by a multi-function peripheral (MFP). Using the soft keyboard can decrease the number of physical hard keys, making it possible to reduce the size of the apparatus, or to increase the size of the display screen by using the area otherwise used for mounting the hard keys.

On the other hand, in order to operate an MFP, an increased number of items of processing conditions are needed for determining the MFP's operations, and correspondingly, an increased number of items of processing conditions should be set on a single operation screen. If a soft keyboard is displayed on top of the operation screen, a part of the operation screen will be hidden under the soft keyboard. This makes it difficult for a user to check to which one of the plurality of items included in the operation screen the setting value to be input using the soft keyboard corresponds.

SUMMARY OF THE INVENTION

An aspect of the present invention provides an image forming apparatus which includes: a process execution portion to execute processing; a display portion to display an image; a setting screen displaying portion to display, on the display portion, a setting screen for setting a setting value for each of a plurality of setting items that determine processing conditions for the process execution portion to execute the processing; an input screen displaying portion to display, on the display portion, an input screen provided independently of the setting screen, the input screen including a plurality of input keys and a plurality of pieces of item information indicating the plurality of setting items, respectively; a position detecting portion to detect a position designated by a user on a display surface of the display portion; an item selecting portion to select one of the plurality of setting items on the basis of the position detected by the position detecting portion; a setting value accepting portion to detect the input key designated by the user from among the plurality of input keys included in the displayed input screen on the basis of the position detected by the position detecting portion and to accept a value determined by the detected input key as a setting value for the setting item that has been selected by the item selecting portion from among the plurality of setting items; and a designation accepting portion to accept a designation by the user, the designation accepting portion being provided independently of the position detecting portion; wherein the input screen displaying portion displays the input screen on the display portion in response to acceptance of a first designation by the designation accepting portion in the state where the setting screen is being displayed on the display portion.

Another aspect of the present invention provides a setting method performed by an image forming apparatus, the image forming apparatus including a process execution portion to execute processing, a display portion to display an image, a position detecting portion to detect a position designated by a user on a display surface of the display portion, and a designation accepting portion to accept a designation by the user, the designation accepting portion being provided independently of the position detecting portion, wherein the method includes: a setting screen displaying step of displaying, on the display portion, a setting screen for setting a setting value for each of a plurality of setting items that determine processing conditions for the process execution portion to execute the processing; an input screen displaying step of displaying, on the display portion, an input screen provided independently of the setting screen, the input screen including a plurality of input keys and a plurality of pieces of item information indicating the plurality of setting items, respectively; an item selecting step of selecting one of the plurality of setting items on the basis of the position detected by the position detecting portion; and a setting value accepting step of detecting the input key designated by the user from among the plurality of input keys included in the displayed input screen on the basis of the position detected by the position detecting portion and accepting a value determined by the detected input key as a setting value for the setting item that has been selected in the item selecting step from among the plurality of setting items; wherein the input screen displaying step includes a step of displaying the input screen on the display portion in response to acceptance of a first designation by the designation accepting portion in the state where the setting screen is being displayed on the display portion.

A further aspect of the present invention provides a non-transitory computer-readable recording medium encoded with a setting program performed by a computer which controls an image forming apparatus, the image forming apparatus including a process execution portion to execute processing, a display portion to display an image, a position detecting portion to detect a position designated by a user on a display surface of the display portion, and a designation accepting portion to accept a designation by the user, the designation accepting portion being provided independently of the position detecting portion, wherein the program causes the computer to perform: a setting screen displaying step of displaying, on the display portion, a setting screen for setting a setting value for each of a plurality of setting items that determine processing conditions for the process execution portion to execute the processing; an input screen displaying step of displaying, on the display portion, an input screen provided independently of the setting screen, the input screen including a plurality of input keys and a plurality of pieces of item information indicating the plurality of setting items, respectively; an item selecting step of selecting one of the plurality of setting items on the basis of the position detected by the position detecting portion; and a setting value accepting step of detecting the input key designated by the user from among the plurality of input keys included in the displayed input screen on the basis of the position detected by the position detecting portion and accepting a value determined by the detected input key as a setting value for the setting item that has been selected in the item selecting step from among the plurality of setting items; wherein the input screen displaying step includes a step of displaying the input screen on the display portion in response to acceptance of a first designation by the designation accepting portion in the state where the setting screen is being displayed on the display portion.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 1 is a perspective view of an MFP according to an embodiment of the present invention;

FIG. 2 is a block diagram schematically showing the hardware configuration of the MFP;

DESCRIPTION OF THE PREFERRED EMBODIMENTS

Figure 3:
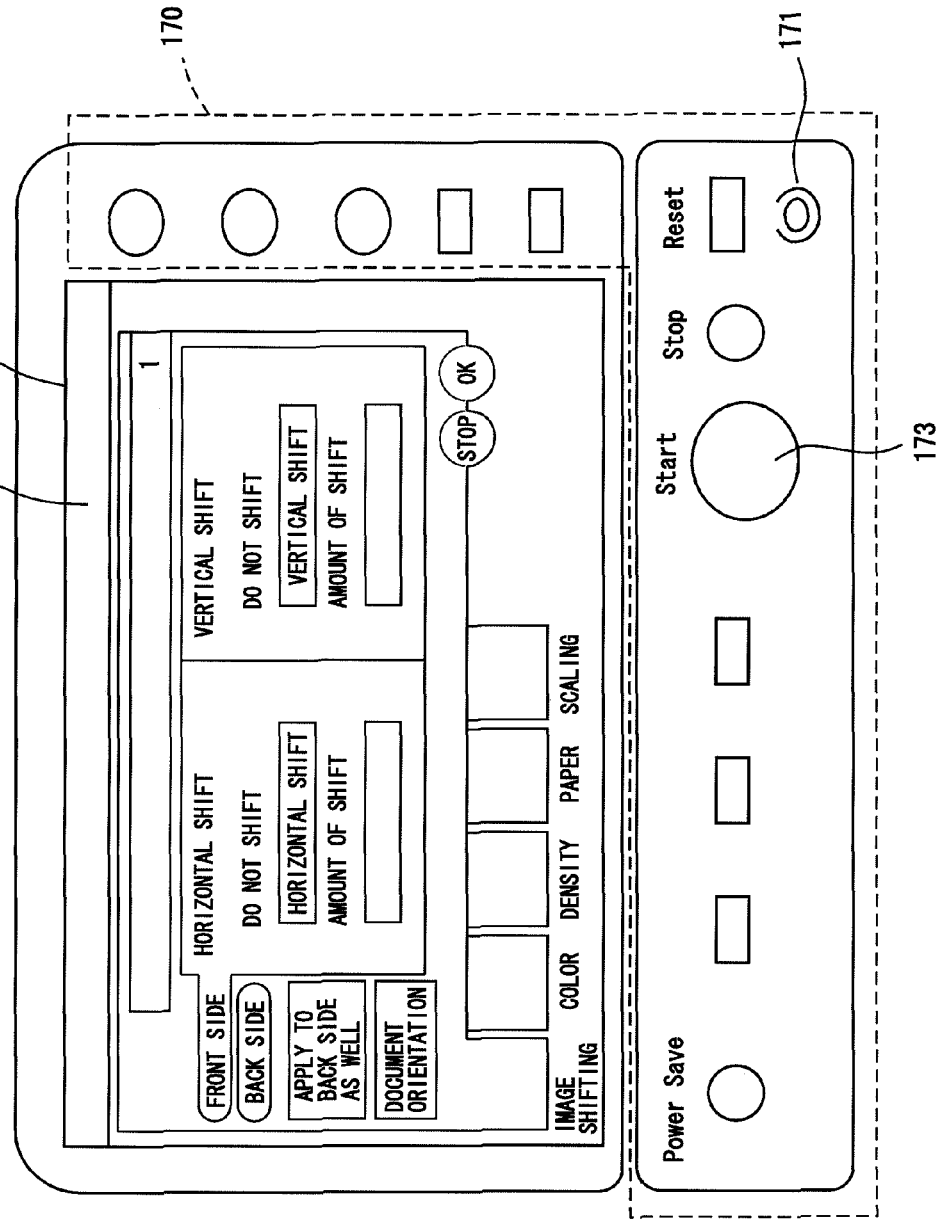
FIG. 3 is a plan view of an operation panel.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 is a perspective view of an MFP according to an embodiment of the present invention. FIG. 2 is a block diagram schematically showing the hardware configuration of the MFP. Referring to FIGS. 1 and 2, an MFP 100 serving as an image forming apparatus includes: a main circuit 110; a document reading portion 130 for reading a document; an automatic document feeder 120 for feeding a document to document reading portion 130; an image forming portion 140 for forming an image on a sheet of paper or the like on the basis of image data which is output from document reading portion 130 that has read a document; a paper feeding portion 150 for feeding a sheet of paper to image forming portion 140; and an operation panel 160 serving as a user interface.

Main circuit 110 includes: a central processing unit (CPU) 111; a communication interface (I/F) portion 112; a read only memory (ROM) 113; a random access memory (RAM) 114; a hard disk drive (HDD) 115 as a mass storage; a facsimile portion 116; and an external storage device 117. CPU 111 is connected with automatic document feeder 120, document reading portion 130, image forming portion 140, paper feeding portion 150, and operation panel 160, and is responsible for overall control of MFP 100.

Automatic document feeder 120 automatically feeds a plurality of documents set on a document feed tray, one by one, to a predetermined document reading position set on a platen glass of document reading portion 130, and outputs the document, the image of which has been read by document reading portion 130, onto a document output tray. Document reading portion 130 includes an optical source which irradiates a document placed on the document reading position with light and a photoelectric conversion element which receives light reflected from the document, and scans a document image having a size corresponding to that of the document. The photoelectric conversion element converts the received light into image data made up of electric signals, and outputs the image data to image forming portion 140. Paper feeding portion 150 feeds a sheet of paper, stored in a paper feed tray, to image forming portion 140.

Image forming portion 140 forms an image using well-known electrophotography. Image forming portion 140 performs various kinds of data processing such as shading compensation on image data received from document reading portion 130 and, on the basis of the processed image data, or on the basis of externally received image data, forms an image on a sheet of paper fed by paper feeding portion 150.

Facsimile portion 116 is connected to public switched telephone networks (PSTN), and transmits facsimile data to or receives facsimile data from the PSTN. Facsimile portion 116 stores the received facsimile data in HDD 115, and also converts the data into print data which can be printed in image forming portion 140 and outputs the same to image forming portion 140, thereby causing image forming portion 140 to form an image on a sheet of paper on the basis of the facsimile data received by facsimile portion 116. Further, facsimile portion 116 converts the data stored in HDD 115 to facsimile data, and transmits the same to a facsimile machine connected to the PSTN.

Communication I/F portion 112 is an interface for connecting MFP 100 to a network. Communication I/F portion 112 communicates with another computer or image forming apparatus which is connected to the network, using a communication protocol such as the transmission control protocol (TCP) or the file transfer protocol (FTP). The network to which communication I/F portion 112 is connected is a local area network (LAN). It may be connected in a wired or wireless manner. The network is not necessarily the LAN; it may be a wide area network (WAN), public switched telephone networks (PSTN), the Internet, or the like.

ROM 113 stores a program to be executed by CPU 111 or data necessary for execution of the program. RAM 114 is used as a work area when CPU 111 executes a program. Further, RAM 114 temporarily stores read data (image data) continuously transmitted from document reading portion 130.

Operation panel 160 includes: a liquid crystal display (LCD) 165; a display control portion 161 which controls display on LCD 165; a video RAM (VRAM) 163; a touch panel 169; a hard key portion 170; and an input control portion 167 which controls touch panel 169 and hard key portion 170. LCD 165 and hard key portion 170 are provided on an upper surface of MFP 100.

Display control portion 161 is connected to CPU 111, VRAM 163, and LCD 165. VRAM 163 is used as a work area of display control portion 161, and temporarily stores an image to be displayed on LCD 165. Display control portion 161, under the control of CPU 111, controls LCD 165 to display the image stored in VRAM 163. Display control portion 161 causes LCD 165 to display an operation screen and an input screen, which will be described later.

Hard key portion 170 includes a plurality of hard keys including at least a start key and a keyboard calling key. The hard keys are connected to input control portion 167. Each hard key outputs ON signals to input control portion 167 while being depressed by a user, whereas it outputs OFF signals to input control portion 167 while not being depressed by a user.

Touch panel 169 is provided on an upper or lower surface of LCD 165, and outputs the coordinates of the position pushed by a user to input control portion 167. Touch panel 169 detects a position designated by a user with his/her finger or a stylus pen, and outputs the coordinates of the detected position to input control portion 167. Touch panel 169 preferably has a size equal to or greater than that of the display surface of LCD 165. As touch panel 169 is provided on the surface of LCD 165, when a user designates a position on the display surface of LCD 165, touch panel 169 outputs to input control portion 167 the coordinates of the position that the user has designated on the display surface of LCD 165. The touch panel may be, for example, of a resistive type, a surface acoustic wave type, an infrared ray type, an electromagnetic induction type, or a capacitance type, although it is not limited to these types.

If there is any hard key that outputs ON signals in hard key portion 170, input control portion 167 outputs to CPU 111 identification information for identifying the hard key that outputs the ON signals. In the event that touch panel 169 detects a position designated by a user, input control portion 167 outputs to CPU 111 the coordinates that are output from touch panel 169.

External storage device 117 is controlled by CPU 111, and is mounted with a compact disc-ROM (CD-ROM) 118 or a semiconductor memory.

FIG. 3 is a plan view of operation panel 160. Referring to FIG. 3, operation panel 160 includes LCD 165, touch panel 169 which is provided on a surface of LCD 165, and hard key portion 170 having a plurality of hard keys arranged to the right of and below LCD 165. Hard key portion 170 includes a keyboard calling key 171 and a start key 173.

Figure 4:
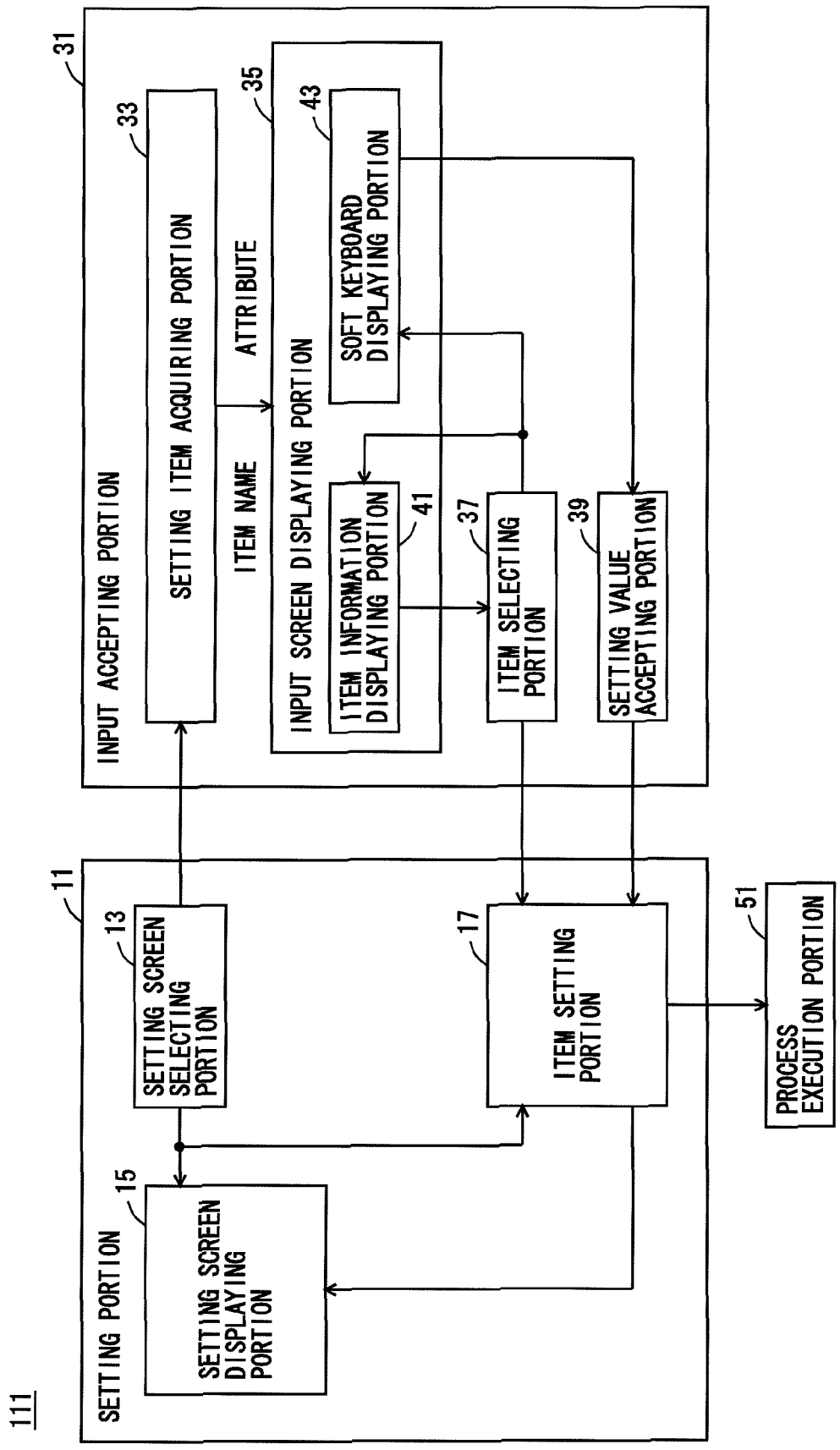
FIG. 4 is a block diagram showing, by way of example, the functions of a CPU included in the MFP.

FIG. 4 is a block diagram showing, by way of example, the functions of the CPU included in the MFP. The functions shown in FIG. 4 are implemented by CPU 111 included in MFP 100 as CPU 111 executes a program stored in ROM 113, HDD 115, or CD-ROM 118. Referring to FIG. 4, CPU 111 includes a setting portion 11, an input accepting portion 31, and a process execution portion 51. Process execution portion 51 controls communication I/F portion 112, facsimile portion 116, HDD 115, external storage device 117, automatic document feeder 120, document reading portion 130, image forming portion 140, and paper feeding portion 150, to perform processing under the processing conditions set by setting portion 11.

The processing performed by process execution portion 51 includes, for example, scan processing, copy processing, print processing, and facsimile transmission/reception processing. When the setting is made to perform scan processing as one of the processing conditions, process execution portion 51 controls automatic document feeder 120, document reading portion 130, HDD 115, external storage device 117, and communication I/F portion 112, so as to cause an image of a document read by document reading portion 130 to be output to at least one of HDD 115, external storage device 117, and communication I/F portion 112, in accordance with the processing conditions. When the processing condition to set HDD 115 as a destination is set as one of the processing conditions, process execution portion 51 stores the image in HDD 115. When the processing condition to set external storage device 117 as a destination is set as one of the processing conditions, process execution portion 51 stores the image in a semiconductor memory mounted on external storage device 117. When the processing condition to set communication I/F portion 112 as a destination is set as one of the processing conditions, process execution portion 51 transmits the image via communication I/F portion 112. The image may be transmitted by e-mail, or by using the file transfer protocol (FTP), server message block (SMB), or the like. In the case where e-mail is set as the transmission method, e-mail having an image attached thereto is generated for transmission.

When the setting is made to perform copy processing as one of the processing conditions, process execution portion 51 controls automatic document feeder 120, document reading portion 130, paper feeding portion 150, and image forming portion 140, so as to cause image forming portion 140 to form an image of a document read by document reading portion 130 on a sheet of paper supplied from paper feeding portion 150, in accordance with the processing conditions that have been set.

When the setting is made to perform print processing as one of the processing conditions, process execution portion 51 controls communication I/F portion 112, HDD 115, external storage device 117, image forming portion 140, and paper feeding portion 150, so as to cause image forming portion 140 to form an image on a sheet of paper supplied from paper feeding portion 150, in accordance with the processing conditions that have been set. The image to be formed by image forming portion 140 is set by one of the processing conditions. It may be an image of print data that is received from a computer connected to a network via communication I/F portion 112, or an image of data stored in HDD 115 or external storage device 117.

Furthermore, when the setting is made to perform facsimile transmission processing as one of the processing conditions, process execution portion 51 controls automatic document feeder 120, document reading portion 130, HDD 115, external storage device 117, and facsimile portion 116, so as to cause facsimile portion 116 to transmit an image of facsimile data. The facsimile data to be transmitted by facsimile portion 116 is set by one of the processing conditions. It may be an image that document reading portion 130 reads from a document and outputs in accordance with the processing conditions, or an image stored in HDD 115 or external storage device 117.

When the setting is made to perform facsimile reception processing as one of the processing conditions, process execution portion 51 controls facsimile portion 116, HDD 115, external storage device 117, image forming portion 140, and paper feeding portion 150, so as to output an image of facsimile data. When the processing condition to set HDD 115 as a destination is set as one of the processing conditions, process execution portion 51 stores the image of facsimile data in HDD 115. When the processing condition to set external storage device 117 as a destination is set as one of the processing conditions, process execution portion 51 stores the image of facsimile data in a semiconductor memory mounted on external storage device 117. When the processing condition to set communication I/F portion 112 as a destination is set as one of the processing conditions, process execution portion 51 generates e-mail having the image of facsimile data attached thereto, and transmits the e-mail via communication I/F portion 112.

Setting portion 11 includes a setting screen selecting portion 13, a setting screen displaying portion 15, and an item setting portion 17. Setting screen selecting portion 13 selects one of a plurality of setting screens stored in advance in HDD 115, and outputs setting screen identification information for identifying the selected setting screen to setting screen displaying portion 15 and item setting portion 17, and also outputs setting screen information of the selected setting screen to input accepting portion 31.

A plurality of setting screens correspond respectively to a plurality of processing conditions for process execution portion 51 to perform processing. For example, the setting screens include a setting screen for causing process execution portion 51 to perform scan processing, a setting screen for causing process execution portion 51 to perform copy processing, a setting screen for causing process execution portion 51 to perform print processing, and a setting screen for causing process execution portion 51 to perform facsimile transmission/reception processing. The setting screen is used to set a setting value for each of a plurality of setting items which determine the processing conditions for process execution portion 51 to perform the processing. The setting screen has an area for displaying an item name and a setting value for each of a plurality of setting items. The setting screens also include a setting screen provided with a transition function. The setting screen with the transition function has at least one transition button allowing a user to select another setting screen.

The setting screen information includes, for each of the plurality of setting items included in the setting screen, a set of an item name of the setting item and an attribute of the setting value to be set for the setting item. The attribute includes text or numeric, and in the case of the text, its type and the number of letters, and in the case of the numeric, the number of digits.

For example, setting screen selecting portion 13 displays on LCD 165 a menu screen that includes a plurality of pieces of setting screen identification information for identifying a plurality of setting screens, respectively. When a user operates touch panel 169 or hard key portion 170 to select one of the plurality of pieces of setting screen identification information displayed on the menu screen, setting screen selecting portion 13 selects the setting screen corresponding to the selected setting screen identification information. In the state where a setting screen with the transition function is displayed on LCD 165, when a user operates touch panel 169 or hard key portion 170 to designate a transition button included in the setting screen with the transition function, setting screen selecting portion 13 selects the setting screen that is associated with the designated transition button.

When setting screen displaying portion 15 receives the setting screen identification information from setting screen selecting portion 13, setting screen displaying portion 15 reads from HDD 115 the setting screen specified by the setting screen identification information, and displays the read setting screen on LCD 165. More specifically, setting screen displaying portion 15 outputs the setting screen to display control portion 161, to cause display control portion 161 to display the image of the setting screen on LCD 165.

Input accepting portion 31 includes a setting item acquiring portion 33, an input screen displaying portion 35, an item selecting portion 37, and a setting value accepting portion 39. Once setting screen selecting portion 13 has selected a setting screen, setting item acquiring portion 33 receives setting screen information from setting screen selecting portion 13. Setting item acquiring portion 33 then outputs the received setting screen information to input screen displaying portion 35.

When input screen displaying portion 35 receives the setting screen information from setting item acquiring portion 33 and then detects depression of keyboard calling key 171, input screen displaying portion 35 displays an input screen on LCD 165. More specifically, input screen displaying portion 35 outputs the input screen to display control portion 161, to cause display control portion 161 to display the image of the input screen on LCD 165. The input screen includes a plurality of item names (i.e. pieces of item information) corresponding respectively to a plurality of setting items included in the setting screen information, and also includes a plurality of input keys.

Here, it has been configured such that input screen displaying portion 35 displays the input screen on LCD 165 when input screen displaying portion 35 detects depression of keyboard calling key 171 after receiving the setting screen information from setting item acquiring portion 33. Alternatively, it may be configured such that input screen displaying portion 35 displays the input screen on LCD 165 when it receives the setting screen information from setting item acquiring portion 33, or when a setting item is selected as a process target by item selecting portion 37, which will be described later.

Input screen displaying portion 35 includes an item information displaying portion 41 and a soft keyboard displaying portion 43. Item information displaying portion 41 displays a plurality of item names included in the setting screen information of the input screen in such a manner that the item names are overlaid on the setting screen being displayed on LCD 165. More specifically, item information displaying portion 41 outputs the plurality of item names to display control portion 161, to cause display control portion 161 to generate an image by synthesizing the images of the item names and the image of the setting screen together, while giving higher priority to the images of the item names than to the image of the setting screen, and further cause display control portion 161 to display the generated image on LCD 165. Item information displaying portion 41 outputs, for each of the plurality of setting items, a set of the item name and the position on the setting screen at which an image of that item name is displayed, to item selecting portion 37.

Item selecting portion 37 selects, as a process target, one of the plurality of setting items that has been selected by a user. Specifically, when a user designates one of the images of the plurality of item names displayed on LCD 165 with his/her finger, touch panel 169 detects the position designated by the user. Item selecting portion 37 specifies which one of the images of the plurality of item names has been designated by the user, on the basis of the coordinates on the display surface of LCD 165 that have been detected by touch panel 169, and selects the setting item that corresponds to the image of the item name that has been specified. Item selecting portion 37 outputs the item name of the setting item, selected from among the plurality of setting items, to item information displaying portion 41, soft keyboard displaying portion 43, and item setting portion 17.

At the stage before an item name is input from item selecting portion 37, or, in other words, at the stage before a user selects a setting item as a process target, item information displaying portion 41 sets a predetermined setting item as a process target from among the plurality of setting items included in the setting screen information, and outputs the item name of the setting item selected as the process target to item selecting portion 37. In this case, item selecting portion 37 outputs the item name input from item information displaying portion 41, to item information displaying portion 41, soft keyboard displaying portion 43, and item setting portion 17. Thereafter, when a user selects another setting item as a process target, item selecting portion 37 outputs the item name of the setting item selected from among the plurality of setting items, to item information displaying portion 41, soft keyboard displaying portion 43, and item setting portion 17.

Item information displaying portion 41 displays the image of the item name of the setting item selected as the process target from among the plurality of setting items in a display manner different from that for the images of the other item names. More specifically, of the plurality of setting items included in the setting screen information, item information displaying portion 41 specifies the setting item having the item name input from item selecting portion 37 as the setting item selected as the process target, and displays the image of the item name of the specified setting item in a display manner different from that for the images of the other item names. Here, the item name of the setting item selected as the process target is highlighted. Alternatively, the image of the item name of the setting item selected as the process target may be increased in lightness compared to the images of the item names of the other setting items. Still alternatively, the images may be differentiated in hue or saturation, in image size, in font, or in contour.

Soft keyboard displaying portion 43 receives the setting screen information from setting item acquiring portion 33 and the item name of the setting item selected as the process target from item selecting portion 37. Soft keyboard displaying portion 43 displays a plurality of input keys corresponding to the setting item selected as the process target, in such a manner that the input keys are overlaid on the setting screen being displayed on LCD 165. The plurality of input keys are respectively assigned values as their key names. Specifically, soft keyboard displaying portion 43 outputs the key names for the respective input keys to display control portion 161, to cause display control portion 161 to generate an image by synthesizing the images of the key names of the input keys and the image of the setting screen together, while giving higher priority to the images of the key names of the input keys than to the image of the setting screen, and further cause display control portion 161 to display the generated image on LCD 165. Soft keyboard displaying portion 43 outputs, to setting value accepting portion 39, a set of a key name and the position on the setting screen at which an image of that key name is displayed, for each of the plurality of input keys.

Soft keyboard displaying portion 43 searches the setting screen information input from setting item acquiring portion 33 for the attribute of the setting value that is paired with the item name input from item selecting portion 37, and displays only the input keys needed to input a value of the specified attribute. In the case where the attribute of the setting item, i.e. the attribute of the setting value to be set for the setting item, is numeric, soft keyboard displaying portion 43 displays ten input keys to which the numerals 0 to 9 are respectively assigned. In the case where the attribute of the setting item is text, soft keyboard displaying portion 43 displays 26 input keys to which the letters of the alphabet are respectively assigned. The numerals or letters assigned to the input keys become the key names, and the images of the numerals or letters are displayed overlaid on the setting screen.

Setting value accepting portion 39 accepts a setting value on the basis of one or more of the plurality of input keys designated by a user. When a user designates, with his/her finger, any of the images of the plurality of key names displayed on LCD 165, touch panel 169 detects the position designated by the user. Then, on the basis of the coordinates on the display surface of LCD 165 that have been detected by touch panel 169, setting value accepting portion 39 specifies which one of the images of the plurality of key names has been designated by the user, and selects the input key that corresponds to the specified key name image. Setting value accepting portion 39 outputs the value assigned to the selected input key, as a setting value, to item setting portion 17. In the case where a plurality of input keys are selected successively, setting value accepting portion 39 arranges the values assigned respectively to the selected input keys in the selected order to obtain a value, and outputs the obtained value as the setting value to item setting portion 17. For example, in the state where the numerals "0" to "9" are assigned respectively to the ten input keys, when the input key to which the numeral "1" is assigned is selected in the first place and the input key to which the numeral "2" is assigned is selected in the second place, then the value "12", with the second numeral "2" arranged to the right of the first numeral "1", is determined as the setting value, and the setting value "12" is output to item setting portion 17. In the case where the letters of the alphabet are assigned respectively to the 26 input keys, a string of a plurality of letters, arranged in the input order, is output as the setting value to item setting portion 17.

Item setting portion 17 receives the setting screen identification information from setting screen selecting portion 13, the item name of the setting item from item selecting portion 37, and the setting value from setting value accepting portion 39. When receiving the setting value from setting value accepting portion 39, item setting portion 17 temporarily stores in RAM 114 a set of the setting value and the item name of the setting item that has been received from item selecting portion 37 prior to the reception of the setting value. Whenever receiving a setting value from setting value accepting portion 39, item setting portion 17 temporarily stores a set of the setting value and the item name of the setting item into RAM 114, until a setting instruction is detected. This means that two or more sets may be temporarily stored in RAM 114. The setting instruction is input by a user as the user presses keyboard calling key 171. Item setting portion 17 detects the setting instruction by detecting the event that keyboard calling key 171 switches from OFF to ON.

It is noted that the setting instruction may be input by a user as the user presses a setting key that is provided in hard key portion 170 separately from keyboard calling key 171. In this case, item setting portion 17 detects the setting instruction by detecting the event that the setting key provided in hard key portion 170 separately from keyboard calling key 171 switches from OFF to ON.

Meanwhile, ROM 113 stores, for each piece of setting screen identification information, default setting values predetermined respectively for a plurality of setting items. When item setting portion 17 receives setting screen identification information from setting screen selecting portion 13, prior to detection of a setting instruction, item setting portion 17 reads the default setting values for the respective setting items that are stored in ROM 113 in correspondence with the received setting screen identification information, and stores in RAM 114 a plurality of sets of the default setting values and the item names of the corresponding setting items as processing conditions. When a setting instruction is detected, item setting portion 17 outputs the set of the setting value and the item name of the setting item temporarily stored in RAM 114 to setting screen displaying portion 15, and further, updates the processing conditions on the basis of the set of the setting value and the item name of the setting item temporarily stored in RAM 114. More specifically, item setting portion 17 selects the set temporarily stored in RAM 114, extracts from the plurality of sets stored in RAM 114 as the processing conditions the set including the default setting value for the same item name of the setting item as the one being included in the selected set, and updates the default setting value in the extracted set with the setting value included in the selected set.

Whenever the setting instruction is detected, item setting portion 17 updates the setting value that has been stored in RAM 114 as the processing condition with the setting value that is input from setting value accepting portion 39 and temporarily stored in RAM 114, until an execution instruction is input by the user. Every time the setting instruction is detected, item setting portion 17 updates the processing condition, and further outputs the set of the setting value and the item name of the setting item temporarily stored in RAM 114, to setting screen displaying portion 15.

The execution instruction is issued by a user, for example as the user presses start key 173 provided on operation panel 160. When item setting portion 17 detects the depression of start key 173, item setting portion 17 determines that the execution instruction has been issued by the user, and item setting portion 17 outputs the execution instruction to process execution portion 51. The execution instruction includes the sets of the setting values and the item names of the setting items that are stored as the processing conditions in RAM 114.

Whenever the set of the setting value and the item name of the setting item is input from item setting portion 17, setting screen displaying portion 15 updates the setting screen being displayed on LCD 165. More specifically, setting screen displaying portion 15 recomposes a setting screen by arranging the image of the setting value received from item setting portion 17 in the area for displaying the setting value corresponding to the setting item on the setting screen, and displays the recomposed setting screen on LCD 165. In this manner, the setting value that a user has input as the setting value is displayed on the setting screen, allowing the user to confirm the setting value by checking the setting screen. It is noted, as the input screen is being displayed, an image having the image of the input screen overlaid on the image of the setting screen is displayed on LCD 165 by display control portion 161.

Figure 5:
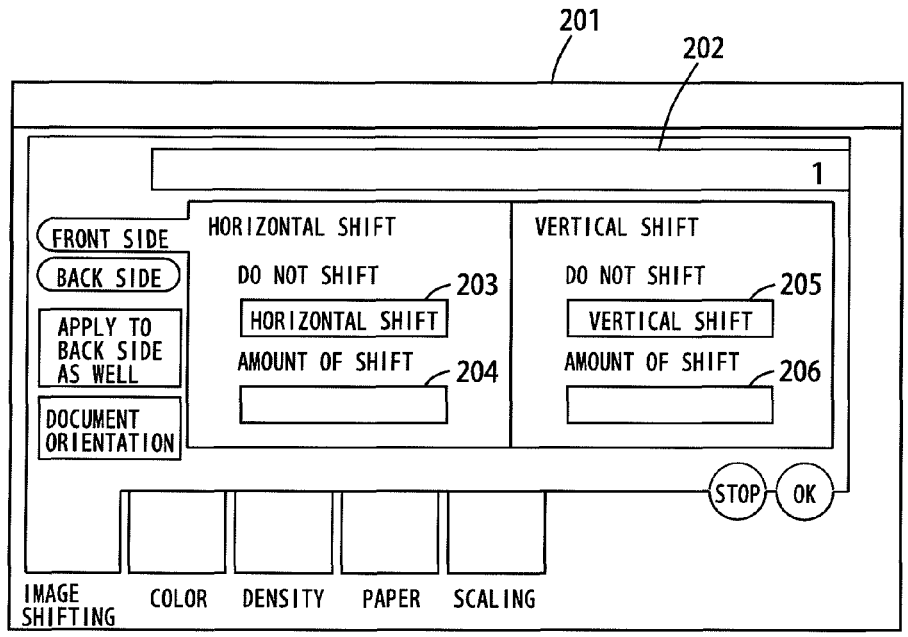
FIG. 5 shows an example of a setting screen.

FIG. 5 shows an example of a setting screen. Referring to FIG. 5, a setting screen 201 includes an area 202 for inputting therein a setting value for a setting item having the item name "number of copies", an image 203 of an item name "horizontal shift", an area 204 for inputting therein a setting value for the setting item having the item name "horizontal shift", an image 205 of an item name "vertical shift", and an area 206 for inputting therein a setting value for the setting item having the item name "vertical shift".

Figure 6:
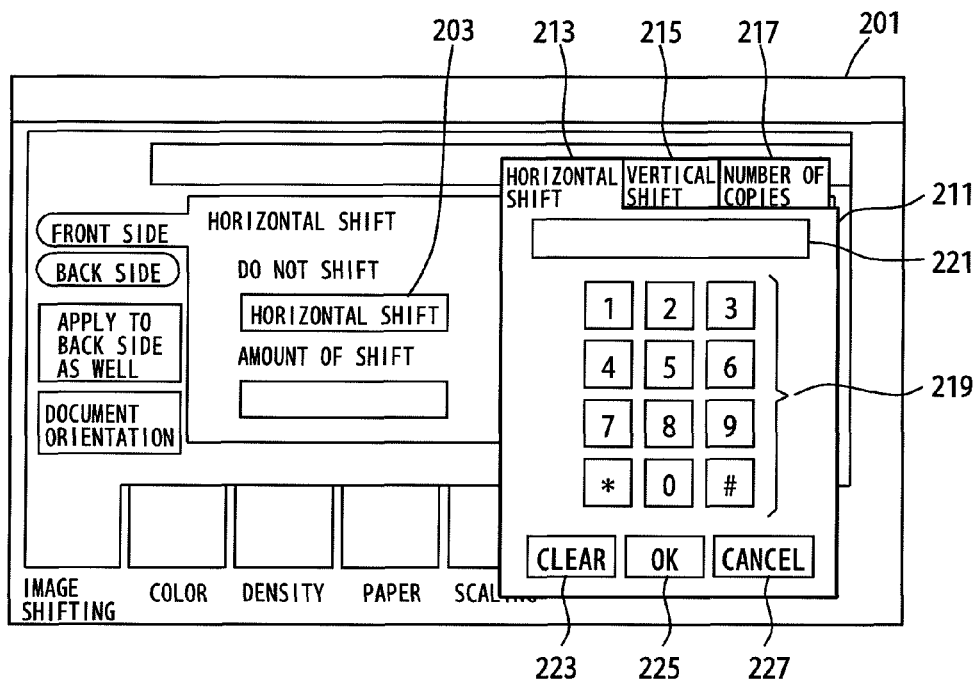
FIG. 6 shows an example of an input screen that is displayed overlaid on a setting screen.

FIG. 6 shows an example of an input screen that is displayed overlaid on a setting screen. An input screen 211 shown in FIG. 6 corresponds to the setting item having the item name "horizontal shift" that is included in setting screen 201. Referring to FIG. 6, input screen 211 includes areas 213, 215, and 217 for displaying three item names respectively, an area 221 for displaying a setting value, input keys 219, a clear key 223, an OK key 225, and a cancel key 227.

Areas 213, 215, and 217 include the item names "horizontal shift", "vertical shift", and "number of copies", respectively, of the three setting items included in setting screen 201. Input keys 219 include ten input keys to which the numerals 0 to 9 are respectively assigned and two input keys to which the symbols "*" and "#" are respectively assigned.

Clear key 223 is assigned a command to cancel the setting value that the user has input by designating any of input keys 219. OK key 225 is assigned a command to accept the input setting value. Here, the command assigned to OK key 225 is the same as the one assigned to keyboard calling key 171. Cancel key 227 is assigned a command to return the input setting value to the default setting value.

Figure 7:
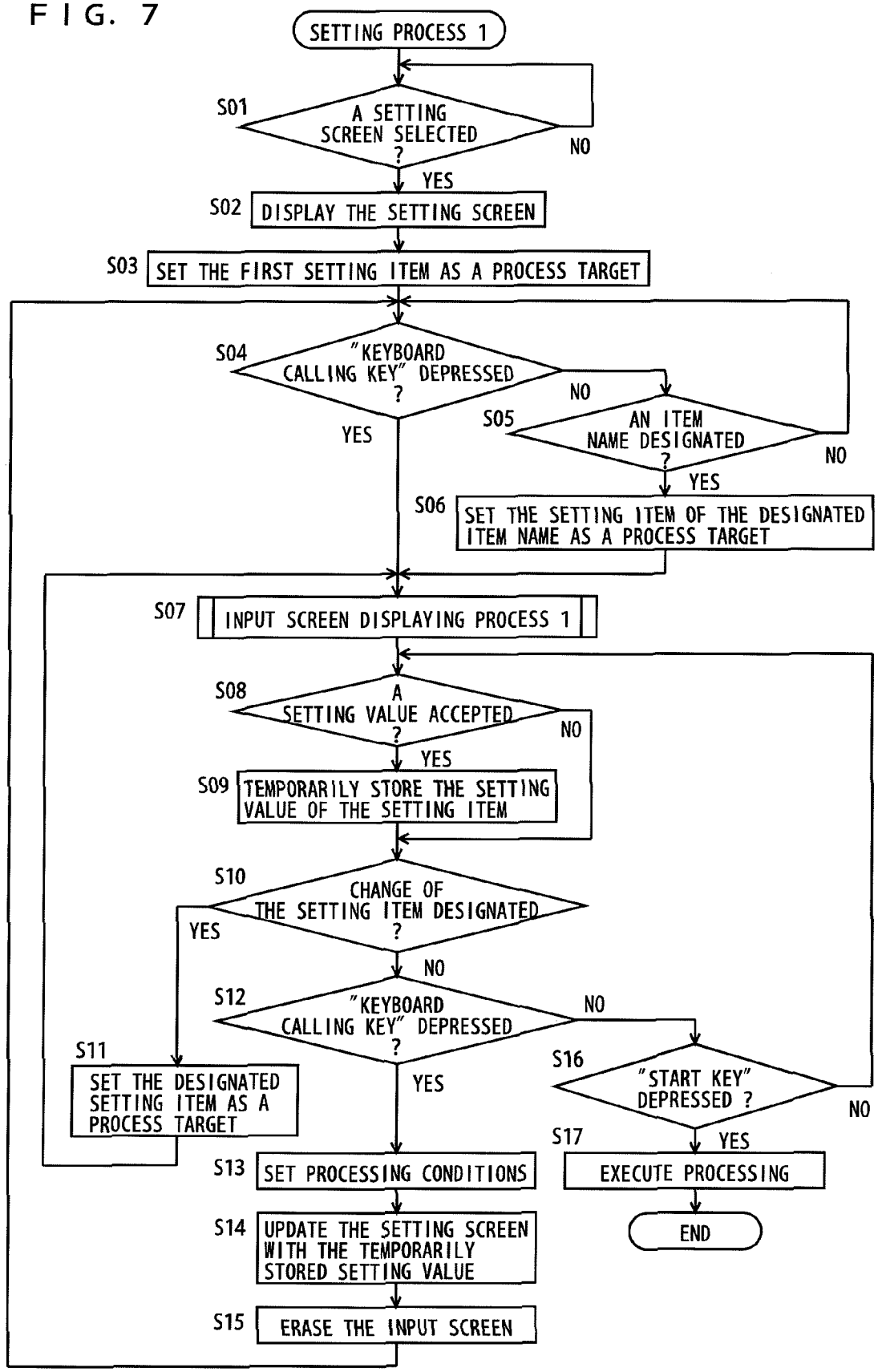
FIG. 7 is a flowchart illustrating an example of the flow of a setting process.

FIG. 7 is a flowchart illustrating an example of the flow of a setting process. The setting process is carried out by CPU 111 included in MFP 100 as CPU 111 executes a program stored in ROM 113, HDD 115, or CD-ROM 118.

Referring to FIG. 7, CPU 111 determines whether a setting screen has been selected (step S01). In the state where a menu screen is being displayed on LCD 165, if a user selects one of a plurality of pieces of setting screen identification information included in the menu screen, or in the state where a setting screen with the transition function is being displayed on LCD 165, if the user selects a transition button, then CPU 111 determines that a setting screen has been selected. CPU 111 is in a standby mode until a setting screen is selected ("NO" in step S01), and once the setting screen is selected ("YES" in step S01), the process proceeds to step S02.

In step S02, CPU 111 displays the selected setting screen on LCD 165. In the case where one of the plurality of pieces of setting screen identification information is selected by the user on the menu screen being displayed on LCD 165, CPU 111 displays on LCD 165 the setting screen specified by the selected setting screen identification information. In the case where the transition button is selected by the user on the setting screen with the transition function being displayed on LCD 165, CPU 111 displays on LCD 165 the setting screen specified by the setting screen identification information that is assigned to that transition button. The setting screen has areas for displaying the item names of a plurality of setting items corresponding respectively to a plurality of setting values that determine processing conditions, and areas for displaying the setting values that are set for the respective setting items.

In the following step S03, CPU 111 sets a first setting item as a process target. More specifically, from among the plurality of setting items included in the setting screen displayed on LCD 165 in step S02, the first setting item is set as the process target. It is noted that the setting item to be set as the process target is not limited to the first one of the setting items included in the setting screen; a predetermined setting item may be set as the process target.

In the following step S04, CPU 111 determines whether keyboard calling key 171 has been depressed. If so, the process proceeds to step S07; otherwise, the process proceeds to step S05. In step S05, CPU 111 determines whether an item name has been designated. If one of the item names of the plurality of setting items included in the setting screen displayed on LCD 165 has been designated, the process proceeds to step S06; otherwise, the process returns to step S04. In step S06, CPU 111 sets the setting item having the designated item name as a process target, and the process proceeds to step S07.

In step S07, CPU 111 performs an input screen displaying process. The input screen displaying process, which will be described later in detail, is a process of displaying an input screen including a plurality of input keys so as to be overlaid on the setting screen.

In the following step S08, CPU 111 determines whether a setting value has been accepted. If one of the input keys included in the input screen has been designated, CPU 111 determines that a setting value has been accepted. If so, the process proceeds to step S09; otherwise, the process proceeds to step S10, with step S09 being skipped. In step S09, CPU 111 temporarily stores a set of the setting item set as the process target in step S03, S06, or S11 (described later) and the setting value accepted in step S08, in RAM 114. The process then proceeds to step S10.

In step S10, CPU 111 determines whether a designation to change the setting item has been accepted. CPU 111 determines whether an operation of changing the setting item being set as the process target has been accepted. More specifically, CPU 111 determines whether any one of the plurality of pieces of item information (i.e. item names) included in the input screen that is different from the piece of item information corresponding to the setting item currently set as the process target has been designated. If the different piece of item information has been designated, CPU 111 determines that the designation to change the setting item has been accepted, and the process proceeds to step S11; otherwise, the process proceeds to step S12.

In step S11, CPU 111 sets the setting item corresponding to the item information designated in step S10 as a process target, and the process returns to step S07. In step S07, the input screen corresponding to the setting item newly set as the process target is displayed on LCD 165.

On the other hand, in step S12, CPU 111 determines whether keyboard calling key 171 has been depressed. If so, the process proceeds to step S13; otherwise, the process proceeds to step S16. In step S13, CPU 111 sets the processing conditions, and the process proceeds to step S14. For setting the processing conditions, any of the default setting values for the respective setting items stored in ROM 113 is updated with the setting value for the corresponding setting item temporarily stored in step S09.

In step S14, CPU 111 updates the setting screen by using the setting value for the setting item temporarily stored in step S09. As a result, the set processing condition is displayed on the setting screen. In the following step S15, CPU 111 erases the input screen from LCD 165, and the process returns to step S04. As a result, only the setting screen is left on LCD 165.

On the other hand, in step S16, CPU 111 determines whether start key 173 has been depressed. If so, the process proceeds to step S17; otherwise, the process returns to step S08. In step S17, CPU 111 performs processing in accordance with the processing conditions, and the process is terminated. In the case where step S13 has been executed, CPU 111 performs the processing in accordance with the set processing conditions. In the case where step S13 has not been executed, CPU 111 sets the processing conditions by updating any of the default setting values for the respective setting items stored in ROM 113 with the setting value for the corresponding setting item temporarily stored in step S09, and performs the processing in accordance with the set processing conditions.

The processing to be performed in step S17 is determined in accordance with the setting screen that has been displayed in step S02. More specifically, when the setting screen is a copy condition setting screen for setting processing conditions for copy processing, CPU 111 performs the copy processing. When the setting screen is a scan condition setting screen for setting processing conditions for scan processing, CPU 111 performs the scan processing. When the setting screen is a print condition setting screen for setting processing conditions for print processing, CPU 111 performs the print processing. When the setting screen is a facsimile transmit condition setting screen for setting processing conditions for facsimile transmission processing, CPU 111 performs the facsimile transmission processing.

Figure 8:
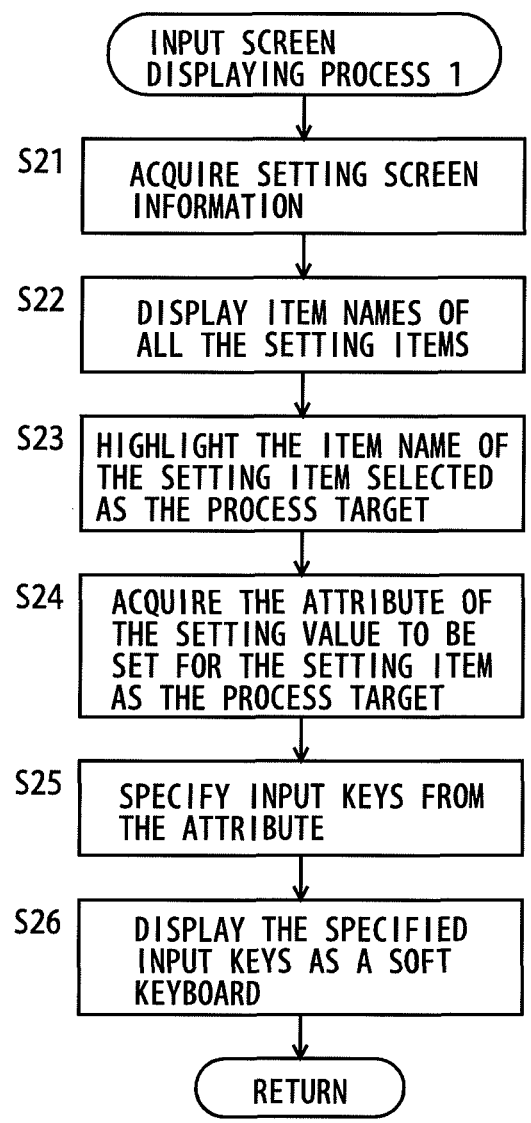
FIG. 8 is a flowchart illustrating an example of the flow of an input screen displaying process.

FIG. 8 is a flowchart illustrating an example of the flow of the input screen displaying process. The input screen displaying process is executed in step S07 in FIG. 7. Referring to FIG. 8, CPU 111 acquires setting screen information in step S21. More specifically, CPU 111 stores setting screen information for each setting screen in HDD 115 in advance. CPU 111 reads from HDD 115 the setting screen information that is associated with the setting screen identification information for the setting screen that has been displayed on LCD 165, to thereby acquire the setting screen information.

In the following step S22, CPU 111 displays on LCD 165 an item name of any setting item included in the setting screen. More specifically, CPU 111 displays the item name so as to be overlaid on the setting screen being displayed on LCD 165. In the case where the setting screen includes two or more setting items, CPU 111 displays the item names of all the setting items on LCD 165. CPU 111 then highlights the item name of the setting item that has been selected as the process target from among the plurality of setting items being displayed (step S23). This can notify the user which one of the plurality of item names being displayed has been selected, and thus, inform the user of the setting item to which an input setting value is to be set.

In the following step S24, CPU 111 acquires the attribute of the setting value for the setting item being set as the process target. More specifically, CPU 111 determines the attribute that has been set for each setting item in the setting screen information acquired in step S21. In the following step S25, CPU 111 specifies the input keys to which the values with the acquired attribute have been assigned. In the case where the attribute is numeric, CPU 111 specifies the ten input keys to which ten numerals 0 to 9 are respectively assigned. In the case where the attribute is text, CPU 111 specifies the 26 input keys to which the 26 letters of the alphabet, A to Z, are respectively assigned.

Then, CPU 111 displays the specified input keys as a soft keyboard on LCD 165 (step S26). More specifically, CPU 111 displays the input keys so as to be overlaid on the setting screen being displayed on LCD 165. Each input key includes an image of a value with the attribute (for example, numeric or text) acquired in step S24. When a user designates an image of an input key with his/her finger, the input key designated by the user is specified by the coordinates detected by touch panel 169, so that the numeral or letter assigned to the specified input key is accepted as a setting value in step S08 in FIG. 7.

As described above, MFP 100 according to the present embodiment displays a setting screen for setting a setting value for each of a plurality of setting items that determine processing conditions for executing copy, scan, print, or facsimile transmission processing. MFP 100 further displays an input screen including a plurality of input keys and a plurality of pieces of item information that indicate the plurality of setting items, respectively, included in the setting screen. When one of the plurality of setting items included in the input screen is selected and one of the plurality of input keys is designated by the user, then MFP 100 sets a setting value for the selected setting item. As the input screen includes a plurality of input keys and a plurality of pieces of item information indicating the respective setting items that determine the processing conditions, the user merely needs to use the input screen alone to set the setting values that determine the processing conditions for executing copy, scan, print, or facsimile transmission processing. Using only the input screen facilitates the user's operations of inputting the setting values that determine the processing conditions for executing the copy, scan, print, or facsimile transmission processing.

The position that a user designates on the display surface of LCD 165 is detected by touch panel 169, and on the basis of the detected position, the setting item is selected and the setting value is accepted. This eliminates the need to provide hard keys in addition to LCD 165. This allows the number of hard keys to be decreased and the area of operation panel 160 to be reduced, leading to an increase in display area of LCD 165.

In the state where the input screen is being displayed, the accepted setting value is temporarily stored and is refrained from being set as the setting value for determining the processing condition until a user presses keyboard calling key 171. Thus, by merely cancelling the setting value, it can readily be returned to the immediately preceding value.

Further, the input screen displays only the input keys needed to input a value with the attribute set for the setting item, among the plurality of setting items included in the input screen, that corresponds to the item information being selected by the user for inputting the setting value. This allows the number of input keys included in the input screen to be decreased, thereby enabling a reduction in size of the input screen.

Furthermore, the input screen is displayed overlaid on the setting screen. This enables both the setting screen and the input screen to be displayed in large size.

Still further, of the plurality of pieces of item information included in the input screen, the item information being selected as the process target by a user is displayed in a display manner different from that for the unselected pieces of item information. This can notify the user of the setting item for which a setting value is to be set. Although the setting screen is partly hidden under the input screen, the input screen alone can notify the user of the setting item for which the setting value being input is to be set.

<Modification>

MFP 100 according to a modification is configured to delete any of a plurality of item names included in the input screen whenever a setting value is set for that item name, so that the input screen includes only the item names in the default state with no setting values set therefore.

CPU 111 included in MFP 100 according to the modification has the same functions as those shown in FIG. 4 except for the functions of item setting portion 17 and item information displaying portion 41. In CPU 111 included in MFP 100 according to the modification, item setting portion 17 outputs a set of the setting value and the item name of the setting item to setting screen displaying portion 15 in response to depression of keyboard calling key 171, and further outputs the item name of the setting item to item information displaying portion 41.

Item information displaying portion 41 displays a plurality of item names included in the setting screen information of the input screen, excluding the item name of the setting item that is input from item setting portion 17, in such a manner that the item names are overlaid on the setting screen being displayed on LCD 165. As a result, only the item names of the setting items having the default setting values set therefore are included in the input screen, allowing the user to know whether a setting value has been set.

Figure 9:
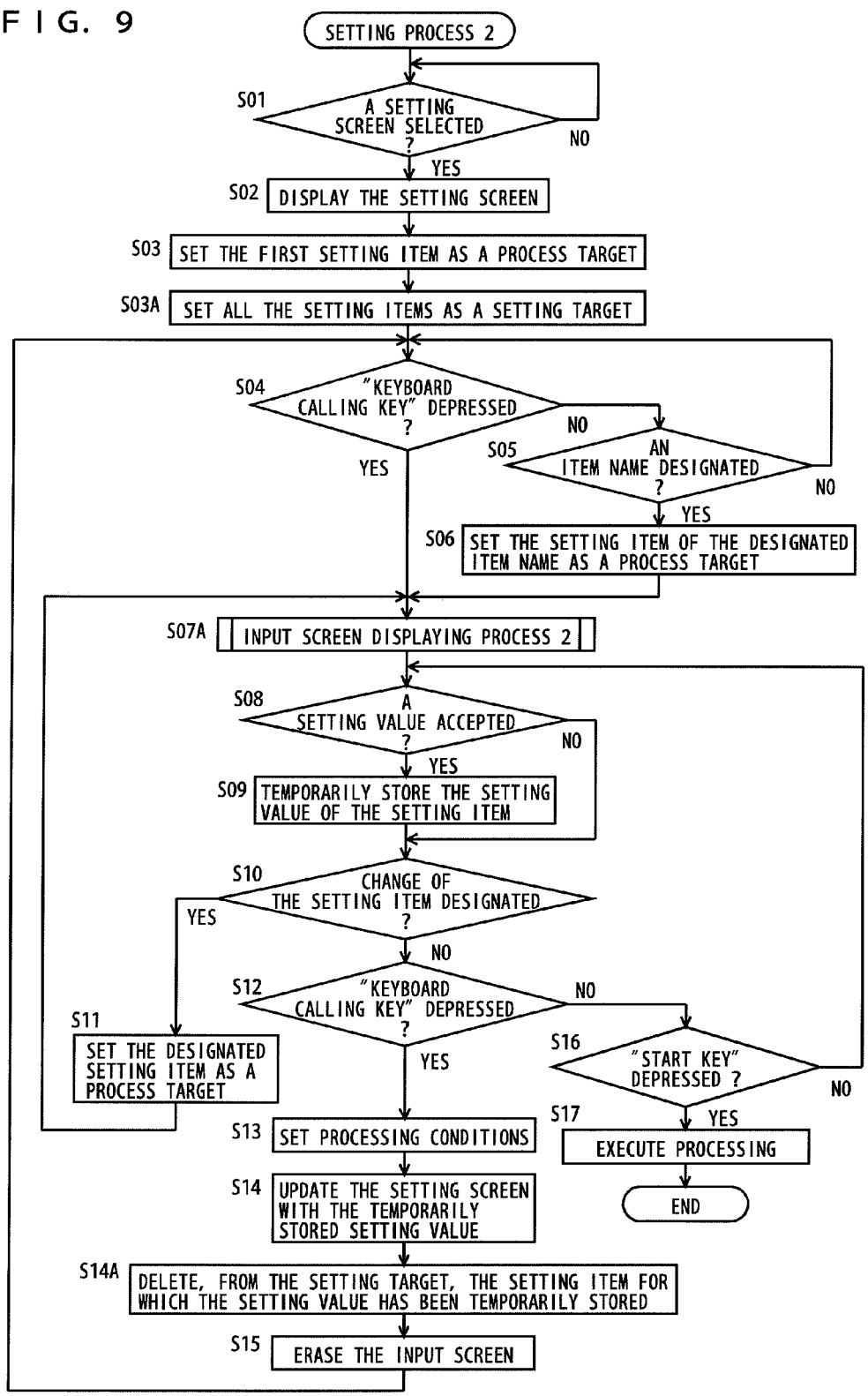
FIG. 9 is a flowchart illustrating an example of the flow of the setting process according to a modification.

FIG. 9 is a flowchart illustrating an example of the flow of the setting process according to the modification. The flowchart shown in FIG. 9 differs from the flowchart shown in FIG. 7 in that step S03A has been added to immediately follow step S03, step S07 has been changed to step S07A, and step S14A has been added between steps S14 and S15. The other processing is identical to that shown in FIG. 7, and therefore, the differences from the processing in FIG. 7 will primarily be described below.

Referring to FIG. 9, in step S03A, CPU 111 sets all the setting items as a setting target, and the process proceeds to step S04. In step S14A, CPU 111 deletes, from the setting target, the setting item for which a setting value has been temporarily stored, and the process returns to step S04. In this manner, in the setting process according to the modification, the plurality of setting items included in the setting screen are classified into two groups of those that are set as the setting target, and those that are not. Before execution of step S14A, the input screen displaying process is performed in step S07A in the state where all the setting items included in the setting screen are set as the setting target. After the execution of step S14A, the input screen displaying process is performed in step S07A in the state where, of the one or more setting items being set as the setting target, the setting item for which the setting value has been temporarily stored in step S09 is deleted from the setting target.

Figure 10:
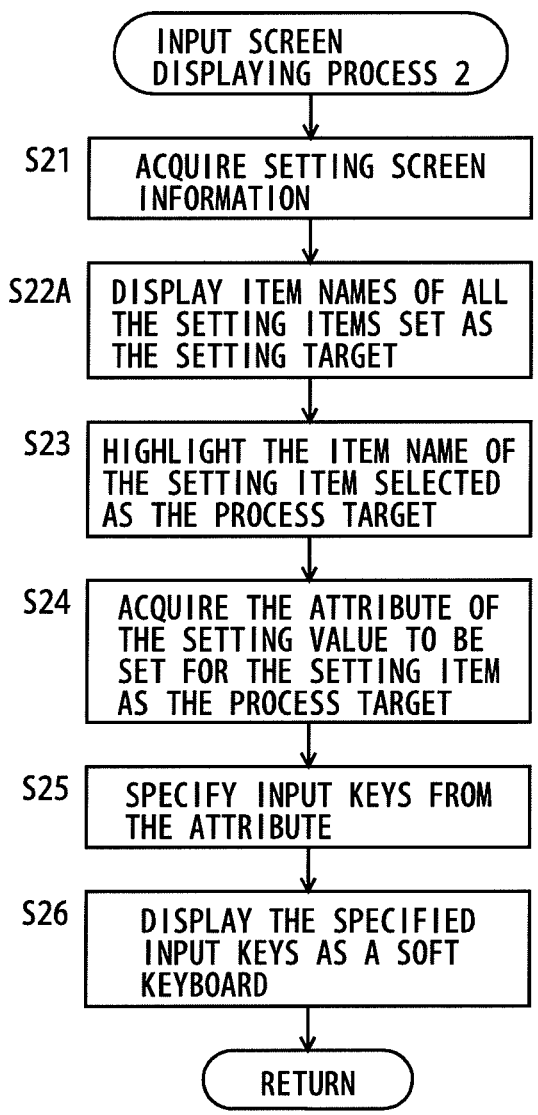
FIG. 10 is a flowchart illustrating an example of the flow of the input screen displaying process according to the modification.

FIG. 10 is a flowchart illustrating an example of the flow of the input screen displaying process according to the modification. The flowchart shown in FIG. 10 differs from the flowchart shown in FIG. 8 in that step S22 has been changed to step S22A. The other processing is identical to that shown in FIG. 8, and therefore, the differences from the processing in FIG. 8 will primarily be described below. Referring to FIG. 10, in step S22A, CPU 111 displays on LCD 165 the item names of all the setting items set as the setting target. Accordingly, only the item names of the setting items that are set as the setting target are displayed on LCD 165. In other words, the input screen including only the item names of the setting items having their setting values unchanged from the default values is displayed on LCD 165. This allows the user to know, from the input screen, any setting item that has its setting value unchanged.

While MFP 100 has been described as an example of the image forming apparatus in the above embodiment, the present invention may of course be identified as a setting method for causing MFP 100 to perform the setting processing shown in FIGS. 7 and 8 or FIGS. 9 and 10, or as a setting program for causing CPU 111 controlling MFP 100 to perform the setting method.

Furthermore, it has been configured in the above embodiment such that the input screen is displayed when a user presses keyboard calling key 171 in the state where the setting screen is being displayed on LCD 165. Alternatively, it may be configured such that the input screen is displayed at the time when the setting screen is displayed.

Although the present invention has been described and illustrated in detail, it is clearly understood that the same is by way of illustration and example only and is not to be taken by way of limitation, the spirit and scope of the present invention being limited only by the terms of the appended claims.

<Appendix>

(1) The image forming apparatus according to claim 1, wherein said input screen displaying portion displays said input screen in response to the displaying of said setting screen.

(2) The image forming apparatus according to any of claims 1 to 9 and (1) above, wherein said item selecting portion selects the setting item that corresponds to the item information selected by the user from among said plurality of pieces of item information included in said displayed input screen.

(3) The image forming apparatus according to claim 1, wherein
in response to detection by said position detecting portion of the position in which one of said plurality of pieces of item information included in said input screen is displayed, said item selecting portion selects one of said plurality of setting items that corresponds to the item information being displayed in said detected position, and
in response to detection by said position detecting portion of the same position as the position in which one of said plurality of input keys is displayed, said setting value accepting portion accepts a value that is determined by the input key being displayed in said detected position.

What is claimed is:

1. An image forming apparatus comprising:
a process execution portion;
a display portion that displays an image;
a setting screen displaying portion that displays, on the display portion, a setting screen for setting a setting value for each of a plurality of setting items that determine processing conditions for the process execution portion;
an input screen displaying portion that displays, on the display portion, an input screen provided independently of the setting screen, the input screen comprising a plurality of input keys for inputting the setting values corresponding to the setting items and a plurality of pieces of item information indicating the same setting items as each of the plurality of setting items set in the setting screen, respectively;
a position detecting portion that detects a position designated by a user on a display surface of the display portion;
an item selecting portion that selects one of the plurality of setting items based on the position detected by the position detecting portion;
a setting value accepting portion that detects the input key designated by the user from among the plurality of input keys included in the displayed input screen based on the position detected by the position detecting portion and that accepts a value determined by the detected input key as a setting value for the setting item selected by the item selecting portion from among the plurality of setting items;
a designation accepting portion that accepts a designation by the user, the designation accepting portion being provided independently of the position detecting portion,
wherein the input screen displaying portion displays the input screen on the display portion in response to acceptance of a first designation by the designation accepting portion when the setting screen is displayed on the display portion.

2. The image forming apparatus according to claim 1, further comprising:
a temporary storage portion that temporarily stores the setting value accepted by the setting value accepting portion; and
an item setting portion that sets, in response to acceptance of the first designation by the designation accepting portion when the input screen is displayed on the display portion, the temporarily stored setting value as the setting value for the setting item that determines the processing condition for the process execution portion.

3. The image forming apparatus according to claim 2, wherein, when the setting value is set by the item setting portion, the input screen displaying portion displays the input screen that includes only the piece or pieces of item information corresponding to the setting items, among the plurality of setting items, other than the setting item for which the setting value has been set.

4. The image forming apparatus according to claim 2, wherein
the designation accepting portion accepts a second designation separately from the first designation, and
the image forming apparatus further comprises an item setting portion that sets, in response to acceptance of the second designation by the designation accepting portion when the input screen is displayed on the display portion, the temporarily stored setting value as the setting value for the setting item that determines the processing condition for the process execution portion.

5. The image forming apparatus according to claim 4, wherein, when the setting value is set by the item setting portion, the input screen displaying portion displays the input screen that includes only the piece or pieces of item information corresponding to the setting items, among the plurality of setting items, other than the setting item for which the setting value has been set.

6. The image forming apparatus according to claim 1, wherein the input screen displaying portion displays the input screen in response to a user's designation of one of the plurality of setting items included in the setting screen when the setting screen is displayed.

7. The image forming apparatus according to claim 1, further comprising a setting item acquiring portion that acquires an attribute of the setting value set for each of the plurality of setting items, wherein the input screen displaying portion comprises:
an item information displaying portion that displays the plurality of pieces of item information indicating the plurality of setting items, respectively, and
a soft keyboard displaying portion that displays only the input keys needed to input a value with the attribute set for the setting item selected by the item selecting portion from among the plurality of setting items.

8. The image forming apparatus according to claim 1, wherein the input screen displaying portion displays the input screen so that the input screen is overlaid on the setting screen when the setting screen is displayed.

9. The image forming apparatus according to claim 7, wherein the input screen displaying portion comprises an item information displaying portion that displays the plurality of pieces of item information indicating the plurality of setting items, respectively,
wherein the item information displaying portion displays one of the plurality of pieces of item information that corresponds to the setting item selected by the item selecting portion in a display manner different from that of one or more of the plurality of pieces of item information that correspond to the unselected setting items.

10. A setting method performed by an image forming apparatus, the image forming apparatus comprising a process execution portion, a display portion that displays an image, a position detecting portion that detects a position designated by a user on a display surface of the display portion, and a designation accepting portion that accepts a designation by the user, the designation accepting portion being provided independently of the position detecting portion, the method comprising:
displaying, on the display portion, a setting screen for setting a setting value for each of a plurality of setting items that determine processing conditions for the process execution portion;
displaying, on the display portion, an input screen provided independently of the setting screen, the input screen comprising a plurality of input keys for inputting the setting values corresponding to the setting items and a plurality of pieces of item information indicating the same setting items as each of the plurality of setting items set in the setting screen, respectively;
selecting one of the plurality of setting items based on the position detected by the position detecting portion; and
detecting the input key designated by the user from among the plurality of input keys included in the displayed input screen based on the position detected by the position detecting portion and accepting a value determined by the detected input key as a setting value for the setting item selected from among the plurality of setting items, wherein the displaying the input screen comprises displaying on the display portion in response to acceptance of a first designation by the designation accepting portion when the setting screen is displayed on the display portion.

11. The setting method according to claim 10, further comprising:

temporarily storing the accepted setting value accepted in the accepting; and setting, in response to acceptance of the first designation by the designation accepting potion when the input screen is displayed on the display portion, the temporarily stored setting value as the setting value for the setting item that determines the processing condition for the process execution portion.

12. The setting method according to claim 11, wherein the displaying of the input screen comprises displaying when the setting value is set, the input screen that includes only the piece or pieces of item information corresponding to the setting items, among the plurality of setting items, other than the setting item for which the setting value has been set.

13. The setting method according to claim 11, wherein the designation accepting portion accepts a second designation separately from the first designation, and the method further comprises setting, in response to acceptance of the second designation by the designation accepting portion when the input screen is displayed on the display portion, the temporarily stored setting value as the setting value for the setting item that determines the processing condition for the process execution portion.

14. The setting method according to claim 13, wherein the displaying of the input screen comprises displaying, when the setting value is set, the input screen that includes only the piece or pieces of item information corresponding to the setting items, among the plurality of setting items, other than the setting item for which the setting value has been set.

15. The setting method according to claim 10, wherein the displaying of the input screen comprises displaying the input screen in response to a user's designation of one of the plurality of setting items included in the setting screen when the setting screen is displayed.

16. The setting method according to claim 10, further comprising acquiring an attribute of the setting value set for each of the plurality of setting items, wherein the displaying of the input screen comprises:

displaying the plurality of pieces of item information indicating the plurality of setting items, respectively, and displaying only the input keys needed to input a value with the attribute set for the setting item selected from among the plurality of setting items.

17. The setting method according to claim 10, wherein the displaying of the input screen comprises displaying the input screen so that the input screen is overlaid on the setting screen when the setting screen is displayed.

18. The setting method according to claim 16, wherein the input screen displaying portion comprises an item information displaying portion that displays the plurality of pieces of item information indicating the plurality of setting items, respectively, and wherein the displaying of the plurality of pieces of item information, comprises displaying one of the plurality of pieces of item information that corresponds to the selected setting item in a display manner different from that of one or more of the plurality of pieces of item information that correspond to the unselected setting items.

19. A non-transitory computer-readable recording medium encoded with a setting program performed by a computer that controls an image forming apparatus comprising a process execution portion, a display portion that displays an image, a position detecting portion that detects a position designated by a user on a display surface of the display portion, and a designation accepting portion that accepts a designation by the user, the designation accepting portion being provided independently of the position detecting portion, the program causing the computer to perform:

displaying, on the display portion, a setting screen for setting a setting value for each of a plurality of setting items that determine processing conditions for the process execution portion;

displaying, on the display portion, an input screen provided independently of the setting screen, the input screen comprising a plurality of input keys for inputting the setting values corresponding to the setting items and a plurality of pieces of item information indicating the same setting items as each of the plurality of setting items set in the setting screen, respectively;

selecting one of the plurality of setting items on the basis of the position detected by the position detecting portion; and detecting the input key designated by the user from among the plurality of input keys included in the displayed input screen on the basis of the position detected by the position detecting portion and accepting a value determined by the detected input key as a setting value for the setting item that has been selected in the item selecting from among the plurality of setting items, wherein the displaying the input screen comprises displaying on the display portion in response to acceptance of a first designation by the designation accepting portion when the setting screen is displayed on the display portion.

* * * * *